United States Patent [19]

Lenk et al.

[11] 4,389,107
[45] Jun. 21, 1983

[54] FOCUSING DEVICE FOR CAMERAS

[75] Inventors: Michael Lenk, Pirna; Gottfried König, Dresden, both of German Democratic Rep.

[73] Assignee: Veb Pentacon Dresden Kamera und Kinowerke, Dresden, German Democratic Rep.

[21] Appl. No.: 264,159

[22] Filed: May 15, 1981

[30] Foreign Application Priority Data

May 16, 1980 [DD] German Democratic Rep. ... 221144

[51] Int. Cl.³ .............................................. G03B 7/08
[52] U.S. Cl. ....................................... 354/25; 354/31; 354/59
[58] Field of Search ................. 354/23 R, 25 R, 31 F, 354/56, 59

[56] References Cited

U.S. PATENT DOCUMENTS

| 3,643,575 | 2/1972 | Ono ........................................ 354/23 |
| 4,083,056 | 4/1978 | Nakamura et al. ..................... 354/25 |
| 4,104,650 | 8/1978 | Hosoe et al. ............................ 354/59 |
| 4,171,155 | 10/1979 | Jyojiki et al. ....................... 354/31 F |

Primary Examiner—Russell E. Adams
Attorney, Agent, or Firm—Dowell & Dowell

[57] ABSTRACT

An arrangement for the automatic critical focusing of optical systems in mirror reflex cameras provided with a partially transmitting reflex mirror, an image field lens arranged in the viewfinder ray path as well as a range-finder image plane, which is equivalent to the film plane. The range-finder image plane, which contains image-forming and deflecting optical components, is arranged in the optical axis of the viewfinder system. By these means a reduction of the expenditure of optical components as well as of the required assembly and adjustment expenditure for automatic critical focusing devices is achieved.

1 Claim, 3 Drawing Figures

FOCUSING DEVICE FOR CAMERAS

BACKGROUND TO THE INVENTION

The invention relates to an arrangement for the automatic critical focusing of optical systems in mirror reflex cameras provided with a partially transmitting reflex mirror, an image field lens arranged in the viewfinder ray path as well as a range-finder image plane that is equivalent to the film plane; photoconductive cells, which are arranged in the range-finder image plane or in the exit pupil of the optical system, emitting signals which, through an electric circuit, bring about an indication of sharpness in the viewfinder and/or the automatic setting of the taking lens.

Principles of the automatic focusing of camera lenses are in many cases based on projecting an image of the object to be critically focused and on obtaining the required sharpness signal in conjunction with measurement receivers, which are provided either in the image plane itself or in the exit pupil plane.

If the image of the object to be critically focused is projected by the taking lens itself, it is known on mirror reflex cameras to produce an image plane that is equivalent to the film plane by means of beam splitters and further auxiliary lenses and mirrors in the camera base. It is furthermore known to produce this range-finder image plane in the viewfinder ray path, that is to say to provide it downstream of the image field lens. The disadvantage of these arrangements is a considerable expenditure of optical components which, in some cases, additionally have to be provided in a movable manner. Another disadvantage is the large adjustment expenditure in order to set the range-finder image plane with sufficient accuracy.

OBJECT OF THE INVENTION

An object of the invention is a reduction of the expenditure of optical components as well as of the required assembly and adjustment expenditure for automatic critical focusing devices.

The task underlying the invention is to provide an electro-optical arrangement of relatively small dimensions for the automatic critical focusing of optical systems in mirror reflex cameras.

SUMMARY OF THE INVENTION

According to the invention, the problem is solved in that the range-finder image plane, which contains image-forming and deflecting components, is preferably arranged in the optical axis of the viewfinder system. Within the scope of the design according to the invention, it is expedient that, in the central part of the image field lens, there is provided a fully or partially reflecting convex lens, with the aid of which single frames of the exit pupil are realisable, through a wedge system, in the plane of the photoconductive cells. According to another feature of the invention, there is arranged behind the partially transmitting reflex mirror a pivotable auxiliary optical system for the real image formation of the object in the lower part of the camera housing. The auxiliary optical system is preferably a concave lens provided with a fully reflecting plane surface. For the production of single frames of the exit pupil on associated photoconductive cells, it is furthermore advantageous that the field lens arranged in the range finder image plane is connected to a wedge system.

BRIEF DESCRIPTION OF THE DRAWINGS

The invention will hereinafter be explained in more detail with reference to two exemplified embodiments. In the drawings.

DESCRIPTION OF PREFERRED EMBODIMENT

Figure 1:
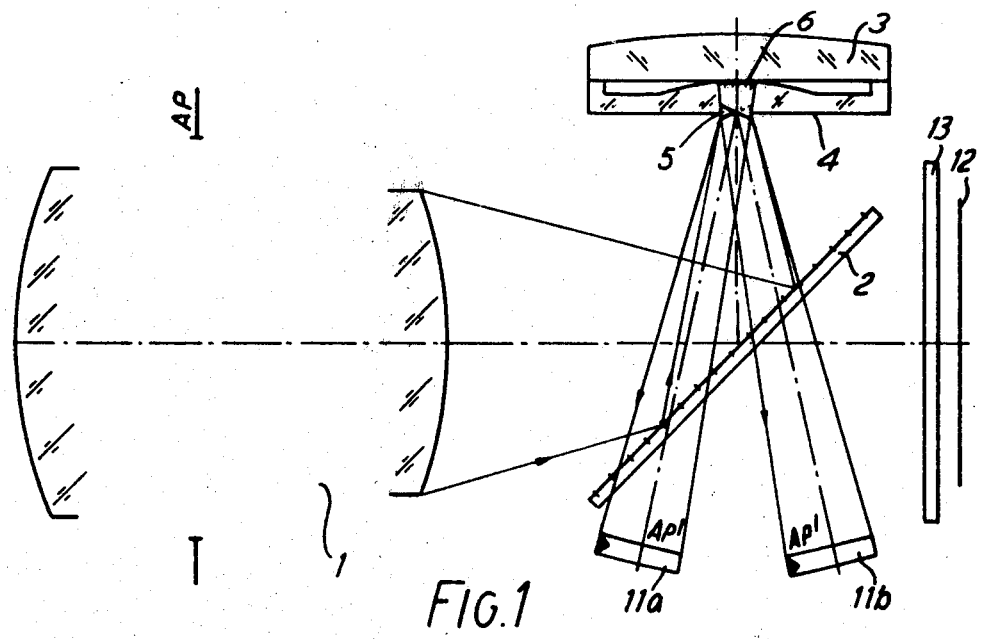
FIG. 1 shows an automatic critical focusing arrangement according to the invention.

As shown in FIG. 1, an objective lens 1 projects through the reflex mirror 2, which is inclined through 45° with respect to the lens axis and which is partially reflecting in known manner, an image of the object on the image field lens 3, which is arranged above the reflex mirror 2. The image field lens 3 is a combined constructional unit, in the central part of which there is provided a fully or partially reflecting convex lens 6 and on the underside of which there is situated a wedge system 5 which is also positioned centrally and coincident with the viewing image plane 4. An image of the exit pupil AP of the objective lens is formed with the aid of the convex lens 6, that is to say a fully or partially reflecting spherical auxiliary mirror, so that the wedge system 5 produces single frames AP' of the exit pupil in the plane of the photoconductive cells 11a, 11b which are arranged beneath the reflex mirror 2 in the corresponding image-forming ray path. In this connection, the range-finder image plane is bounded within the viewing image plane 4 by the wedge system 5 which by this means carries out, inter alia, the function of an image field stop. The measuring picture plane would extend over the whole of the viewing image plane 4 if the wedge system 5 were omitted. With the aid of the wedge system 5 a sufficiently larger region is selected from the range finder image plane for the formation of the measuring value. This means that the wedge system limits the range finder image plane as well as localises or limits it and thereby acts as a picture field diaphragm. The signals emitted by the photoconductive cells 11a, 11b bring about, through an electric circuit not shown, a sharpness indication in the viewfinder and/or the automatic critical focusing of the optical system.

The advantages of the automatic critical focusing arrangement according to the invention consist, on the one hand, in its simple optical construction, since the viewing image plane can be simultaneously utilised as the range finder image plane for the lens measurement system and continues to maintain its effectiveness for the viewfinder ray path; on the other hand, there is no need for any additional movement of the existing optical components. Furthermore, an additional adjustment of the range finder image plane is dispensed with and the reflex mirror 2 does not have to be swivelled away while the photograph is taken.

The arrangement shown according to the invention is only sensitive to vertical light/dark edges. If use is made of a known Duofot biprism, which produces 4 single frames of the AP, it can however also be extended to the utilisation of horizontal edges.

Figure 2:
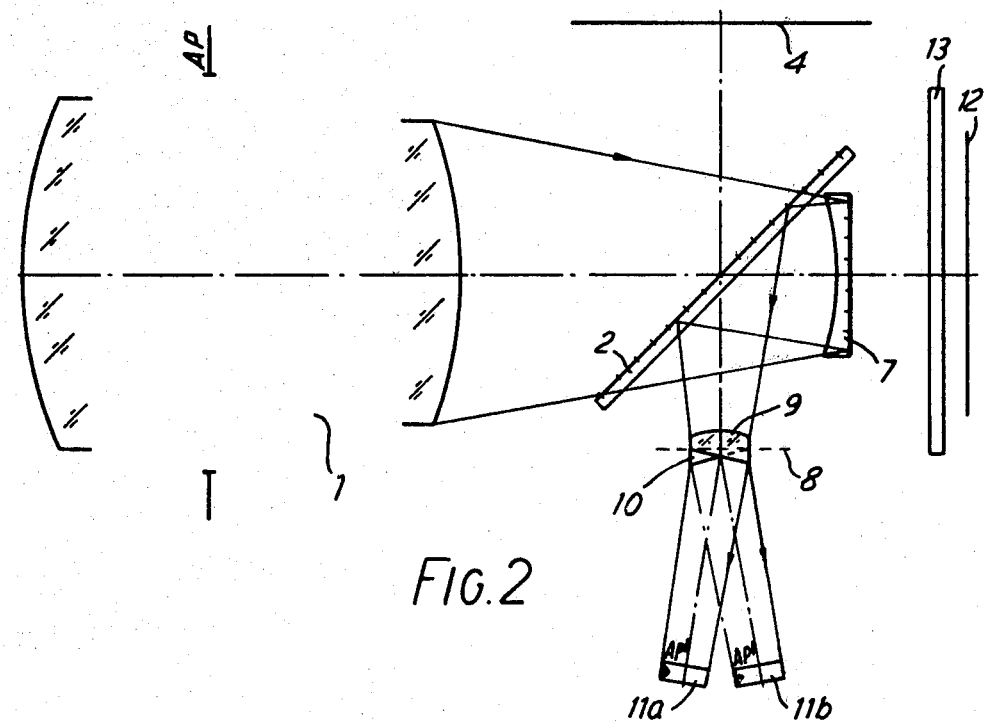
FIG. 2 shows a variant of the automatic critical focusing arrangement according to the invention.

As shown in FIG. 2, there is proposed an automatic critical focusing arrangement wherein the range-finder image plane is situated beneath the reflex mirror 2. There is projected in known manner in the viewing image plane 4 by the objective lens 1 through the reflex mirror 2, which is swivelled away prior to each photograph, an image of the object which the user views through the prism and magnifying glass. Furthermore, there is arranged between the reflex mirror 2 and the film plane 12 an auxiliary optical system 7 which can be swivelled away and takes the form of a concave lens with a fully reflecting plane surface which, through the reflex mirror 2, projects a real image of the object in the lower part of the camera housing. At the site of the range-finder image plane 8, there is provided a field lens 9, the free opening of which bounds the field of measurement. Images of the single frames AP' of the exit pupil are formed in pairs through the wedge system 10, which is fixedly connected to the field lens 9, on the photoconductive cells 11a, 11b. Analogously to the first exemplified embodiment, the wedge system 10 can also be constructed as a Duofot biprism. This constructional form according to the invention has the advantage that no special measuring ray path is necessary and further components for reflecting out as well as another intermediate image plane are thus eliminated.

Figure 3:
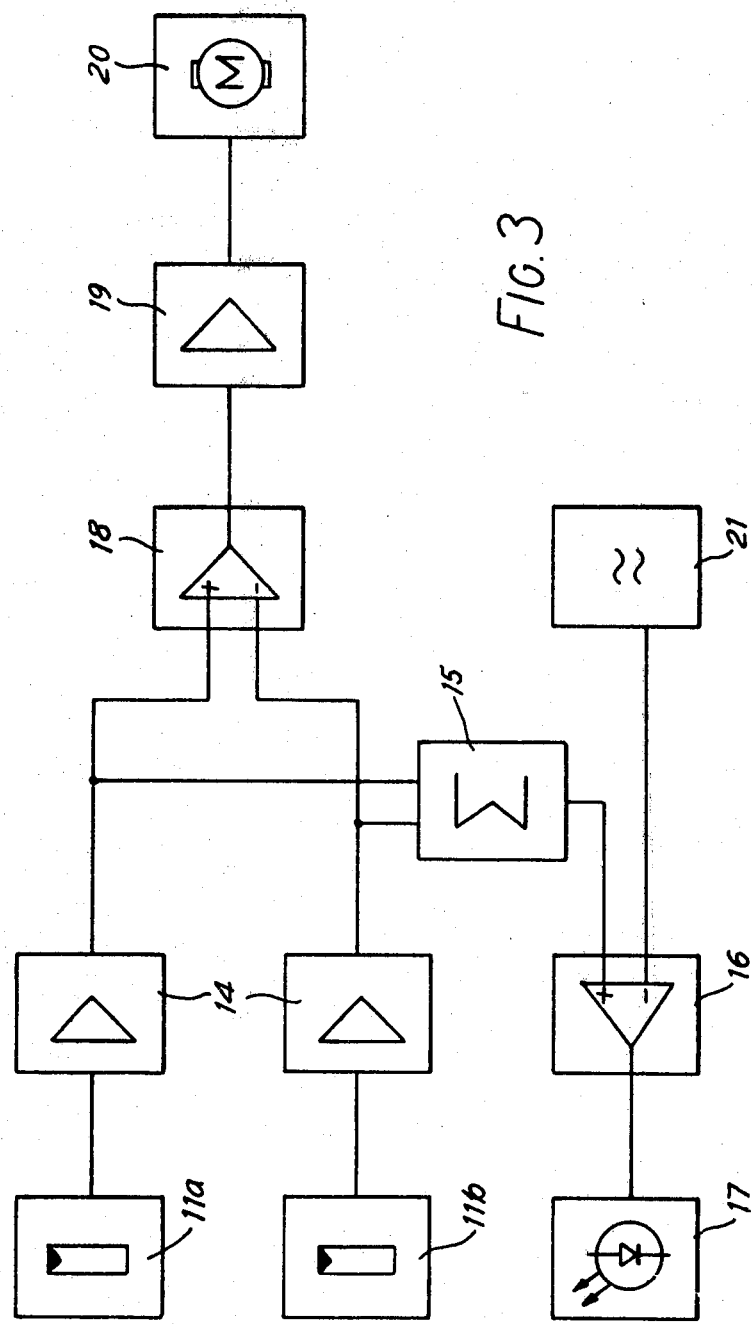
FIG. 3 is a block circuit diaphragm of the arrangement according to the present invention.

The circuit shown in FIG. 3 comprises the photoconductive cells 11a, 11b connected to a pair of amplifiers 14 which respectively output to a comparator 18. Across the leads connected between the amplifier 14 and the comparator 18 there is coupled a summing circuit 15 having an output leading to one input of a further comparator 16, the other input receiving a reference voltage from a signal source 21. The output of the comparator 16 inputs to an infra-red emitting diode. A current amplifier receives the output signal from comparator 18 and provides a controlling power input to the drive motor 20 of the objective lens.

We claim:

1. In a monocular reflex camera comprising a housing, an objective mounted on said housing, a film support plane disposed on the optical axis of the objective, and a shutter between said objective and film support plane and closely adjacent the latter, the provision of a partially light transmitting reflex mirror between said objective and said shutter and inclined to said optical axis of 45° thereto, a composite image field lens of which one portion at the light input side thereof has a convex rear surface, positioned on one side of the mirror to receive the reflected image of the object for the purpose of viewing, a pair of photoelectric cells disposed within the housing and positioned on the other side of said reflex mirror, a pair of image dividing wedges provided centrally of the image field lens at the input side thereof at a distance from said reflex mirror at the optical axis equal to the distance from said reflex mirror at the optical axis to said film support plane, said wedges extending over a mirror central portion of said image field lens, and a concave mirror formed on said convex rear surface of the first part of said image field lens and extending over an area of substantially the same size as the area covered by said wedges, said concave mirror serving to reflect the two images from the wedges back through the wedges to the photoelectric cells which provide an electrical output indicative of the sharpness of focus.

* * * * *